May 10, 1938.    F. V. BROWN ET AL    2,116,960
WARNING AND INDICATING DEVICE FOR AIRCRAFT
Filed May 4, 1937    2 Sheets-Sheet 1

INVENTORS
F. V. Brown.
BY A. Orwood.
Lacy / Lacy, ATTORNEYS

May 10, 1938.  F. V. BROWN ET AL  2,116,960
WARNING AND INDICATING DEVICE FOR AIRCRAFT
Filed May 4, 1937   2 Sheets-Sheet 2
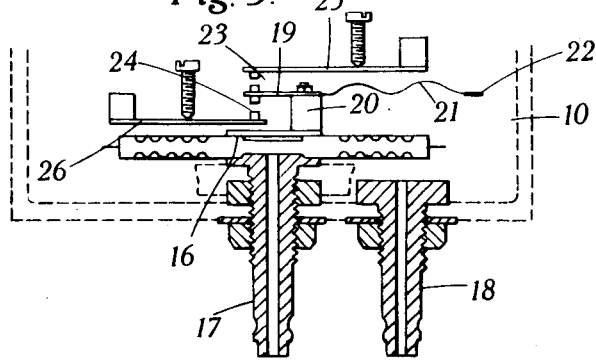
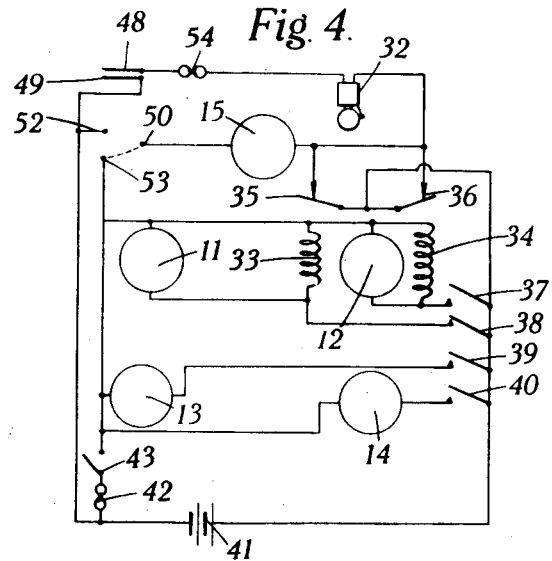
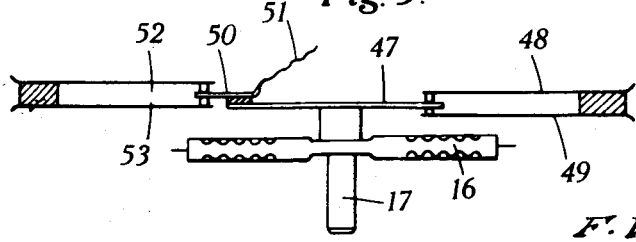
INVENTORS
F. V. Brown.
BY A. Onwood.
Lacey & Lacey,
ATTORNEYS Patented May 10, 1938

2,116,960

UNITED STATES PATENT OFFICE 2,116,960

WARNING AND INDICATING DEVICE FOR AIRCRAFT

Francis Victor Brown, London, and Andre Onwood, Southfields, London, England, assignors to Automotive Products Company Limited, London, England Application May 4, 1937, Serial No. 140,762
In Great Britain April 3, 1936

3 Claims. (Cl. 177—311)

This invention relates to warning and indicating devices for aircraft, and is more particularly intended for use in connection with the retractable undercarriages thereof for indicating to the pilot the position of the undercarriage and to warn him if he attempts to land while the undercarriage is in a partly or completely retracted condition.

It is the main object of the present invention to provide an improved form of warning device which operates automatically should the air speed drop below a predetermined value while the undercarriage is in a condition which is unsuitable for landing. It is a further object of the invention to provide an improved warning and indicating system which can be switched off when the aircraft is on the ground, but which provides a warning when the aircraft is in flight even if the switch is left in its "off" position.

The invention accordingly provides a warning device for an aircraft arranged to give, under conditions approximating to those preparatory to landing, an alarm should the state of the aircraft be unsuitable for landing, said alarm being controlled by means which are sensitive to the air speed of the aircraft. Thus, the warning device may be arranged to indicate when the undercarriage is unsuitable for landing, while the invention further provides a warning device adapted to operate automatically should a predetermined component or controlling means of the aircraft be unsuitable for landing, a capsule or equivalent means being actuated for this purpose in accordance with the air speed of the aircraft and being arranged to control an electric contact device.

As a still further feature the invention provides for an aircraft having a retractable undercarriage, an electrical warning device controlled by means which are responsive to the air speed of the aircraft, an air capsule connected with a Pitot head, Venturi tube or like pneumatic device sensitive to the air speed of the aircraft conveniently being arranged to serve for controlling the electrical warning device.

Further, an improved warning device is provided arranged to give an alarm should a predetermined component or controlling means be unsuitable for landing, said warning device being actuated electrically and comprising a manually controlled switch by which it may be put out of action when the aircraft is stationary, and in combination therewith a switch operated automatically according to the air speed of the aircraft to bring one or more warning signals into action when the aircraft is in motion regardless of the position of the manually controlled switch.

The invention will be illustrated by reference to the accompanying drawings in which Figure 1 is a front elevation of the indicating and warning device as seen by the pilot;

Figure 3 is a sectional elevation showing the constructional arrangement of the pneumatic capsule and associated electric contact device for use therewith;

Figure 4 is a wiring diagram of a modified system; and

Figure 5 is a diagrammatic side view of the capsule and electric contact device for use therewith.

Figure 1:
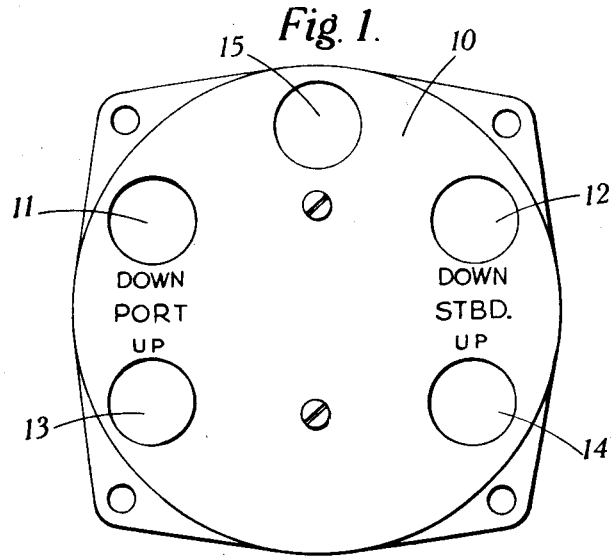
Figure 2:
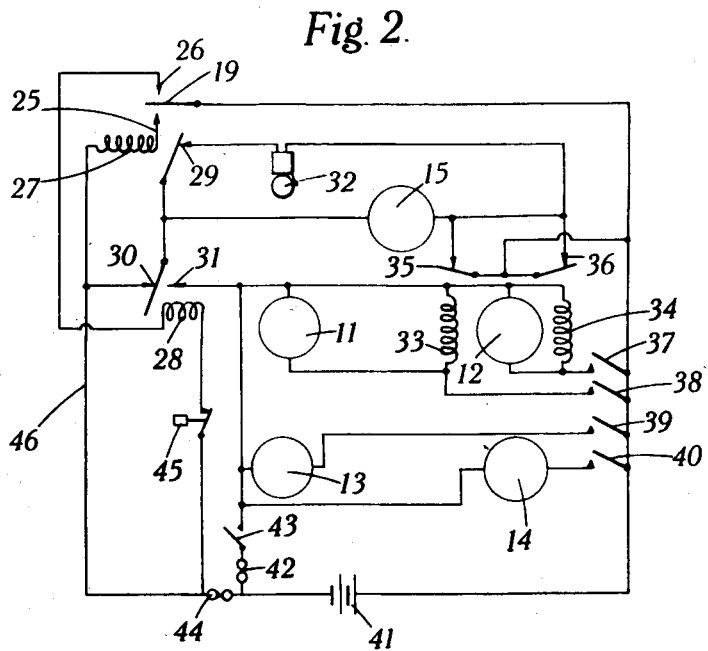
Figure 2 is a diagram of the connections in the preferred system.

Referring to the first example shown in Figures 1, 2 and 3 the preferred warning and indicating device for use in connection with the retractable undercarriage of an aircraft comprises a casing 10 adapted to be fitted to the usual dashboard or instrument panel of an aircraft, the front of said casing being fitted with five electric lamps adapted to show through coloured windows or lenses 11, 12, 13, 14 and 15. The windows or lamps 11 and 12 are both green and correspond with the left hand and right hand undercarriage jacks or units respectively, and in practice indicate that the corresponding undercarriage or side of the undercarriage is in its fully extended position suitable for landing. The windows or lamps 13 and 14 in the same way are coloured amber, and are automatically illuminated when the corresponding undercarriage or part of the undercarriage is in its fully retracted position. The remaining lamp or window 15 which constitutes the main warning is coloured red, and is normally actuated in conjunction with a bell, buzzer or other audible device in a manner which will be better understood from the diagram of connections, Figure 2.

One of the main features of the improved system comprises an electric switch device which is actuated in accordance with the air speed of the aircraft, and is shown diagrammatically in Figure 3. The case 10 is fitted with an expansible capsule 16 having an external pipe connection 17 adapted to be coupled by a flexible or other pipe (not shown) with a Pitot head, Venturi tube or equivalent instrument adapted to expand the capsule 16 as the air speed of the aircraft rises. A pipe connection 18 communicates with the casing 10 so as to maintain the interior of the latter at atmospheric or any other predetermined pressure. A floating electric contact strip 19 is secured to the movable wall of the capsule 16 by means of a block 20 formed of insulating material, and is connected with a terminal strip 22 by a lead 21 which is extremely flexible so as not to impede the action of the capsule 16. A pair of fixed but adjustable contacts 23 and 24 are carried upon flexible strips 25 and 26 respectively, the contacts 19 and 24 being arranged to coact when the speed of the aircraft drops lower than say 30 miles per hour, and the contacts 19 and 23 being connected together when the air speed rises above a value corresponding to the minimum climbing speed of the aircraft, say 90 miles per hour. Intermediate these speeds the capsule 16 is unconstrained mechanically and this enables very sensitive operation and easy adjustment to be obtained.

The warning device which is completely shown in Figure 2 also comprises two relays, the coils of which are indicated at 27 and 28, the former being adapted to break a circuit at 29 when energized, and the relay 28 being of the changeover type having a pair of fixed contacts 30 and 31. Also a bell 32 is connected as shown, and two further relays have their coils 33 and 34 connected respectively in parallel with the green lamps 11 and 12, the arrangement being such that whenever current is being fed to said green lamps the corresponding contacts 35 and 36 of the relays 33 and 34 are broken. Two switches 37 and 38 are arranged to be closed when the two undercarriages or the respective sides of a single undercarriage assume their fully extended positions suitable for landing, but at all other times the switches 37 and 38 are open. Similarly a further two switches 39 and 40 are adapted to be closed only when the undercarriage or undercarriages are in their fully retracted position.

The system is fed from a battery 41, one side of which is connected to the switches 37—40, and in addition is joined to the moving contact members of the relays 33 and 34 and the contact 19 upon the pneumatically actuated capsule. The other pole of the battery is connected by way of a fuse 42 to a manually controlled switch 43 which serves for switching off the indicating device when the aircraft is out of use. A separate lead, however, is taken from the battery 41 from a fuse 44 and a circuit-testing push button switch 45 to the relay coil 28, while another lead 46 connects the battery 41 with the contact 30 and the relay coil 27.

During the normal operation of the warning device the switch 43 is closed prior to the commencement of a flight, and presuming that the undercarriage is completely extended the switches 37 and 38 will be closed, thus lighting the two green lamps 11 and 12 at the same time energizing the relays 33 and 34, so cutting out the red lamp 15 by means of contacts 35 and 36. It will thus be seen that so long as both coils 33 and 34 are energized by the undercarriage being in a condition suitable for landing and by the main switch 43 being "on", the current supply to the red lamp 15 and the warning bell 32 is interrupted at 35 and 36.

When the aircraft is in flight and the undercarriage is retracted the switches 37 and 38 are automatically opened by the action of unlocking the undercarriage, thus causing the green lights 11 and 12 to be extinguished and restoring the contacts 35 and 36. When the undercarriage is fully retracted the switches 39 and 40 are closed, thus illuminating the amber lights 13 and 14.

The action of the red warning light 15 and the bell 33 will now be considered, assuming that the green lights 11 and 12 are extinguished. When the air speed is less than a lower limit, say 30 miles per hour, i. e. when the aircraft is stationary to all intents and purposes the strip 19 contacts with the strip 26, thus energizing the relay coil 28 irrespective of the position of the main switch 43. This causes the contact 30 to be broken, thus isolating the red light 15 and bell 32 from the battery 41. When the air speed rises above 30 miles per hour, however, the contact at 26 is broken, and as a result of the release of the relay 28 a contact is made at 30, thus lighting the red lamp 15 and operating the bell 32. It will be noted that this condition corresponds to that which exists when the aircraft is landing with the undercarriage partly or completely retracted so that it provides the pilot with an audible and a visual warning. When the air speed reaches say 90 miles per hour corresponding to the minimum climbing speed of the aircraft contact is made between the strip 19 and the strip 25, thus energizing the relay coil 27 which breaks the contact at 29 and stops the further operation of the bell 32, although the red light 15 is maintained.

The system is also arranged so that a warning is given to the pilot if the aircraft should be in flight with the main switch 43 open, this warning being given irrespective of the condition of the undercarriage. In this connection it will be noticed that if the switch 43 is "off" the relay coils 33 and 34 must be de-energized, thus causing the contacts 35 and 36 to be closed. Briefly, therefore, the form of the warning is the same as before, the bell 32 and red light 15 being supplied with current as soon as an air speed of 30 miles per hour is reached and the bell being switched off when the air speed reaches 90 miles per hour.

In order that the apparatus may be readily tested when the aircraft is stationary a push button switch 45 is provided, and is arranged so that when it is actuated it breaks the circuit through the relay coil 28, thus having the same effect as raising the air speed above 30 miles per hour.

A somewhat modified system is shown in Figures 4 and 5, where the relays 27 and 28 are dispensed with by duplicating the contacts actuated by the capsule 16. A strip 47 arranged to be moved by the capsule 16 as the latter expands and contracts is disposed between a pair of contacts carried by corresponding spring strips 48 and 49, the arrangement being such that for an air speed from nothing up to 30 miles per hour the strip 47 occupies a position in which it is separated from the strip 48. At 30 miles per hour and at all speeds up to 90 miles per hour the three strips 48, 47 and 49 are in contact, while at speeds greater than 90 miles per hour the strip 47 breaks contact with the strip 49. In effect, therefore, a contact is established between the strips 48 and 49 whenever the air speed lies between 30 and 90 miles per hour. A strip 50 which is carried by the strip 47 but is electrically insulated therefrom is connected to the remainder of the circuit by a flexible lead 51 and operates between a pair of contact strips 52 and 53 which are also of a springy nature. The arrangement in this case is such that at an air speed of 30 miles per hour the strip 50 changes over from the strip 53 to the strip 52, assuming that the air speed is rising.

The general arrangement of the circuit as seen in Figure 4 is substantially the same as that previously described, as far as the connections to the green and amber lights and the relays 33 and 34 are concerned. The contact strip 48 is, however, connected by way of a fuse 54 with the bell 32 while the complementary strip 49 is connected with the battery 41. Similarly the strip 50 is connected with the red light 15 and the associated strips 52 and 53 are connected as shown. Thus, when the air speed is less than 30 miles per hour the red warning light only operates when the main switch 43 is in its "on" position, but should said switch be "off" during the commencement of a flight the strip 50 automatically makes contact with 52 as soon as the air speed rises above 30 miles per hour, and this connects the red light 15 and the bell 32 directly in circuit with the battery 41. Under these conditions the relay contacts 35 and 36 are, of course, closed as the relay coils 33 and 34 cannot be energized until the main switch 43 is closed. Should the pilot refrain from closing the main switch 43 the red light remains illuminated, but the bell 32 is automatically switched off as the air speed rises above 90 miles per hour.

It will be understood that the two general schemes described herein are given merely as examples, and that any other form of warning device may be used in connection with means which are influenced by the air speed of the aircraft. Moreover, the air speeds of 30 and 90 miles per hour which have been taken are merely arbitrary values, and can, of course, be modified to suit various forms of aircraft and differing conditions under which the warning system may be required to operate. Obviously, electric contacts could be incorporated in the usual air speed meter to actuate the system.

What we claim is:

1. A warning device for aircraft having retractible landing gear comprising electrical circuit means including signal means for visibly indicating the retracted and extended positions of said gear, a switch for deenergizing said circuit and signal means, a master signal device for indicating when the gear is retracted, and circuit means shunting said switch for energizing said signal device when the gear is retracted, said energizing means including a switch operated at a predetermined air speed.

2. A warning device for aircraft having retractible landing gear comprising electrical circuit means including signal means for visibly indicating the retracted and extended positions of said gear, a switch for deenergizing said circuit and signal means, a master signal mechanism for visibly and audibly indicating when the gear is retracted, and circuit means shunting said switch for energizing said mechanism when the gear is retracted, said energizing means including a device operated at a predetermined air speed.

3. A warning device for aircraft having retractible landing gear comprising electrical circuit means including signal means for visibly indicating the retracted and extended positions of said gear, a switch for deenergizing said circuit and signal means, other circuit means shunting said switch and including an indicator, a device operable at a predetermined air speed of the aircraft, and a switch operable by said device for energizing said other circuit means and indicator when the gear is retracted.

FRANCIS VICTOR BROWN.
ANDRE ONWOOD.